March 5, 1935.  V. A. ANDERSON  1,993,582
LIVE BAIT HOLDER FOR FISHHOOKS
Filed June 9, 1934
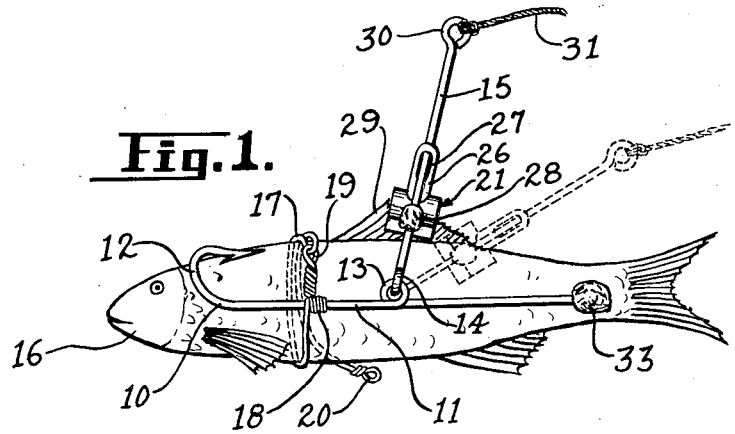
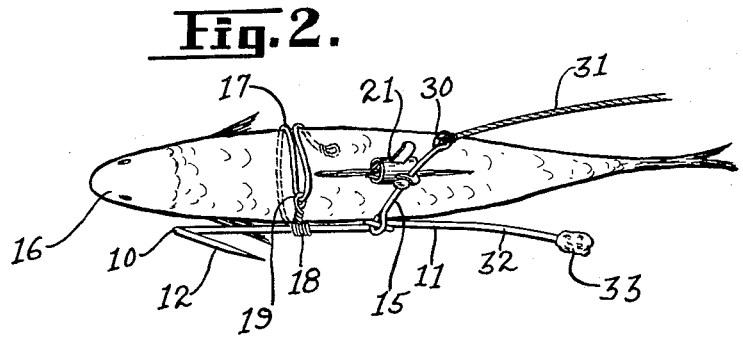
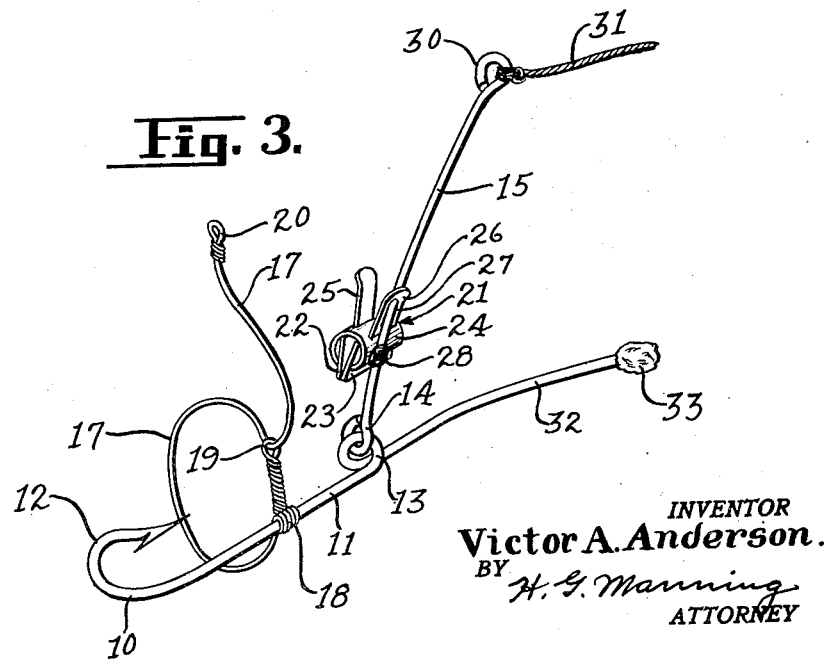
INVENTOR
Victor A. Anderson.
BY H. G. Manning
ATTORNEY Patented Mar. 5, 1935

1,993,582

UNITED STATES PATENT OFFICE 1,993,582

LIVE BAIT HOLDER FOR FISHHOOKS

Victor A. Anderson, Torrington, Conn.

Application June 9, 1934, Serial No. 729,854

11 Claims. (Cl. 43—40)

This invention relates to fishing tackles, and more particularly to a harness for attaching a fish hook to a live minnow or other bait.

One object of this invention is to provide a bait holder or harness of the above nature in which the live bait may be secured to the harness without injuring or killing the bait, and in such a manner as to permit the bait to swim freely in all directions.

A further object is to provide a bait holder of the above nature in which the front of the hook will be disposed adjacent the head of the bait and with its point directed rearwardly so that when a fish strikes at the head of the bait, it will be effectively and securely hooked.

A further object is to provide a bait holder of the above nature which will be simple in construction, inexpensive to manufacture, easy to assemble and manipulate, compact, and very efficient and durable in use.

With these and other objects in view there has been illustrated on the accompanying drawing, one form in which the invention may be conveniently embodied in practice.

In the drawing:

Fig. 1 represents a side elevation of the combination hook and live-bait holder as it appears with a minnow held therein.

Fig. 2 is a top plan view of the same.

Fig. 3 is a perspective view of the bait holder and hook, per se.

Referring now to the drawing in which like reference numerals denote corresponding parts throughout the several views, the numeral 10 indicates a wire fish hook having an elongated shank 11 and an integral barbed hook 12. The central section of the shank 11 is bent to form a circular loop 13, to which is loosely connected an eye loop 14 formed at the end of a line connecting link 15, also constructed of wire.

The fish hook 10 is adapted to be positioned alongside a live bait, such as a minnow 16, and is adapted to be held in such a position by means of a slip noose 17 encircling the body of the minnow. The slip noose 17 is preferably made of fine ductile wire, and is permanently attached to the front part of the hook shank 11 between the barbed hook 12 and the circular loop 13 by means of a tightly wound coil 18, preferably soldered to said hook 10. The noose 17 is adapted to be drawn tightly about the minnow 16 by slipping the free end thereof through a small slip loop 19, locking the noose by bending the ductile wire sharply about said slip loop and then disposing the bent end thereof in close proximity to the body of the minnow. The free end of said noose is provided with a knot 20 for convenience in manipulation.

In order to afford an additional means for holding the hook 10 upon the minnow 16, provision is made of a resilient hinge clip 21 adapted to be clamped upon the dorsal fin 29 of the bait. The clip 21 consists of two converging jaws 22 and 23 held together by a split tubular spring barrel 24. The jaws 22 and 23 are provided with upwardly extending inclined arms 25 and 26, respectively, which pass through slots in the spring barrel 24. The extension arm 26 is provided with a longitudinal slot 27 which is adapted to fit over the line link 15, and the barrel 24 is adapted to be permanently affixed upon said link, as by means of solder 28 (see Figs. 1 and 3).

As best shown in Fig. 1, when the clip 21 is clamped upon the dorsal fin of the minnow, the line link 15 will extend upwardly above the bait in a slightly rearwardly inclined position, and will be connected by means of an eye loop 30 at its upper end to the line 31.

For the purpose of giving the minnow or other live bait freedom to turn and swim about in all directions, when the harness has been applied thereto, the rear end of the hook shank 11 is bent outwardly away from the body of the minnow 16, as indicated at 32. Moreover, the weight of the noose will be compensated for by providing the rear end 32 of the hook shank with a counter-weight 33, preferably of solder.

Operation

In the operation of attaching the harness, the minnow 16 will first be inserted head first through the noose 17, which is initially of large diameter, until the fish hook is disposed alongside the body of the bait. The clip 21 will then be opened and clamped upon the dorsal fin 29 of the minnow. Finally the noose 17 will be tightened up about the body of the minnow and the free end of the ductile wire noose 17 will be folded back about the loop eye 19 and wrapped closely about the body of said minnow, as shown in Figs. 1 and 2.

After a fish has made a "strike" and is partly hooked, and is being drawn in by the reel, the clip 21 will slip off from the fin 29, permitting the line link 15 to tilt rearwardly to the position shown by the dotted lines in Fig. 1,—thus causing the point 12 of the hook to become securely embedded in the mouth of the fish and become completely hooked.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a live bait holder for a fish hook, a link connected to the shank of said hook at a point between the ends thereof, a clip secured to said link for clamping the dorsal fin of said live bait, a bait encircling noose attached to said shank at a point ahead of said link, and means on said link for attachment to a fish line.

2. In a live bait harness, a fish hook comprising a barbed hook and a longitudinal shank, a line connecting link loosely affixed to said shank, a spring clip for clamping upon the dorsal fin of said bait secured to said link, a wire bait encircling noose attached to said shank ahead of said link, and means at the free end of said link for attachment to a fish line.

3. In a live bait holder, a fish hook comprising a longitudinal shank and a barbed hook, a link member having a loose connection with said shank, a spring-pressed clamping member connected to said link member for gripping the back portion of said bait, and means on said shank ahead of said link for embracing the front part of the body of said bait.

4. In a live bait holder, a fish hook comprising a longitudinal shank and a barbed hook, a link member having a loose connection with said shank, a spring-pressed clamping member connected to said link member for gripping the back portion of said bait, and means comprising an adjustable slip noose on said shank ahead of said link for embracing the front part of the body of said bait.

5. In a live bait holder, a fish hook comprising a longitudinal shank and a barbed hook, said shank having a circular loop formed between the ends thereof, a link member having an eye for engaging said loop, a spring-pressed clamping member attached to said link for gripping the top of said bait, said clamping member having a pair of upstanding inclined fingers for operating the same, one of said fingers being secured to said link member, and a slip noose attached to said shank ahead of said circular loop for embracing the front part of the body of said bait.

6. In a live bait holder, a fish hook comprising a longitudinal shank and a barbed hook, said shank having a circular loop formed between the ends thereof, a link member having an eye at its lower end for engaging said loop, a spring-pressed clamping member attached to said link for gripping the top of said bait, said clamping member having a pair of upstanding inclined fingers for operating the same, one of said fingers being secured to said link member, and a slip noose attached to said shank ahead of said circular loop for embracing the front part of the body of said bait.

7. In a live bait holder, a fish hook, a link member having hinging connection with the intermediate section of the shank of said hook, a spring-pressed clamping member attached to said link for gripping the top of said bait, means on said link for attaching a line thereto, the shank of said fish hook having its rear end bent outwardly away from the body of said bait to permit free turning and swimming movement of said live bait, and a slip noose attached to said shank ahead of said link for embracing the front part of the body of said bait.

8. In a live bait holder, a fish hook, a link member having hinging connection with the intermediate section of the shank of a fish hook, a spring-pressed clamping member attached to said link for gripping the top of said bait, means on said link for attaching a line thereto, the shank of said fish hook having its rear end bent outwardly away from the body of said bait to permit free turning and swimming movement of said live bait, the extremity of said bent end having a counterweight affixed thereto to balance the weight of said noose, and a slip noose attached to said shank ahead of said link for embracing the front part of the body of said bait.

9. In a live bait holder, a fish hook, a wire link member having hinging connection with the shank of said hook, a spring-pressed double-jawed clamp attached to said link for detachably holding the dorsal fin of a live minnow until the fish makes a "strike", and a slip noose attached to said shank in front of said link for holding the hook longitudinally alongside the minnow's body.

10. In a live bait holder, a fish hook, a link member having hinging connection with the intermediate section of the shank of said hook, a clamping member attached to said link member for gripping said bait at an intermediate point thereof, and means at the free end of said link for attaching a line thereto.

11. In a live bait holder, a fish hook, means attached to said hook for embracing the body of said bait, a link member having hinging connection with the intermediate section of the shank of said hook, a clamping member attached to said link, said clamping member having frictional gripping engagement with the back portion of said bait and adapted to be disengaged therefrom when the fish makes a "strike" upon the bait, and means on said link for attaching a line thereto.

VICTOR A. ANDERSON.